United States Patent [19]

Lewis

[11] 4,266,895
[45] May 12, 1981

[54] HIGH TORQUE CHUCK ASSEMBLY AND COLLET

[75] Inventor: David L. Lewis, Darien, Ill.

[73] Assignee: The Bendix Corporation, Southfield, Mich.

[21] Appl. No.: 2,118

[22] Filed: Jan. 9, 1979

[51] Int. Cl.³ .......................... B23C 5/26; B23B 31/04
[52] U.S. Cl. ...................................... 409/232; 279/52; 279/59; 279/83; 409/234
[58] Field of Search ....................... 279/46, 47, 48, 49, 279/50, 51, 52, 53, 54, 59, 82, 76, 83, 1 TS; 409/232, 234

[56] References Cited

U.S. PATENT DOCUMENTS

| 3,586,344 | 6/1971 | Nixon | 279/83 |
| 3,811,694 | 5/1974 | Dahlman et al. | 279/83 |

*Primary Examiner*—Z. R. Bilinsky

*Attorney, Agent, or Firm*—Kenneth A. Seaman; Howard G. Massung

[57] ABSTRACT

A chuck assembly and collet for retaining a commercially-available large-diameter, high-torque end mill (or similar) tool against axial pullout and against radial (or rotational) movement with respect to the assembly. The tool includes two axially spaced flat surfaces along the shank, one of which is coupled to the collet to prevent axial pullout and the other of which is coupled to the chuck to prevent rotation with respect to the chuck. The coupling to the chuck is accomplished by a ballclamp screw which extends through an aperture in the collet to the flat surface on the tool. The ballclamp screw has a flattened ball that is pivotally mounted in the screw's engagement and the pivotal mounting accommodates a few degrees misalignment between the shank's flat surface and the screw without significantly affecting the coupling therebetween.

6 Claims, 4 Drawing Figures

HIGH TORQUE CHUCK ASSEMBLY AND COLLET

CROSS REFERENCE TO RELATED PATENTS

The present invention is related to U.S. Patent 4,197,044 issued Apr. 8, 1980 entitled "Chuck Assembly and Collet" and assigned to the assignee of the present application. This patent application, which is specifically incorporated herein by reference, is referred to as the "Non-Pullout Collet Patent".

The present invention is also related to a patent application Ser. No. 2,116 filed Jan. 9, 1979 by Better and Lehde entitled "Slotted Collet and Method of Making" and assigned to the assignee of the present application. This patent application, which is also specifically incorporated herein by reference, is referred to as the "Slotted Collet Patent".

The present invention is related to a patent application Ser. No. 2,119 filed Jan. 9, 1979 by John Christopher Staron entitled "Improved Chuck Assembly and Collet" and assigned to the assignee of the present application. This patent application, which is specifically incorporated herein by reference, is referred to as the "Improved Non-Pullout Collet Patent".

FIELD OF THE INVENTION

The present invention relates to machine tools generally and, more specifically, to holding assemblies for retaining large cutting tools during machining in industrial applications.

The present invention has particular application to chuck assemblies or holders for retaining large (⅝ inch diameter shank and larger) end mill tools. The present invention is also relevant to the holders for other precision cutting tools which develop high rotational torques during machining.

BACKGROUND OF THE INVENTION

Large-diameter, high-torque end mill (and similar) tools present a difficult problem relating to suitable holders or holding assemblies. Such tools must be held firmly against axial pullout forces and radial rotational forces, with a minimum amount of looseness between tool and holder when secured. Further, the tool should be easily and quickly inserted into and secured within the holder and the tool shank required should be of a design conventional to commercially-available end mill (or similar) tools.

The prior art tool holders for such tools has suggested two divergent generic approaches to the problem, neither of which is entirely satisfactory. The first approach uses a collet and chuck assembly, with the tool and collet held in place within the chuck body by frictional forces resulting from tightening of a collet nut. This approach provides the desired centering ability through the collet action but has a limited resistance to rotational forces, since the collet may be rotated within the chuck (and the tool shank within the collet) by a rather low rotational force.

By adding a non-pullout feature or assembly as described in the referenced Non-Pullout Collet Patent, the resistance of the tool shank to rotation with respect to the collet is improved. Other prior art systems have set screws or tangs coupled between the collet and shank to retain the tool shank within the collet. Such screws or tangs resist tool rotation with respect to the collet; however, none of these prior art techniques provides a rotationally-resistance connection from the tool shank to the chuck body (and through the collet). A direct connection between the chuck body and the tool shank is desirable, however, for maximum effectivenss in transmitting driving force. Further, a frictional retaining force may be degraded somewhat by industrial contaminants (oils, etc.) which lubricate the connection, reducing friction therebetween and the retaining force.

The other generic approach eliminates the collet altogether and provides a mounting of the tool to the chuck through the provision of one or more set screws within the chuck and used with or without special-made grooves in the tool shank. This approach is undesirable because the special tool shank grooves require customizing of each tool. Also, the lack of a collet in this assembly eliminates two advantages of a collet: a convenient and quick way of eliminating the clearance necessary for tool insertion; and centering device within the chuck. Both of these advantages of a collet enable precision machining by the entire machine and, therefor, the assemblies without a collet have inherent limitations regarding the precision (or tolerances) to which the machining can be held.

Further, in both of the generic approaches of the prior art, the tool must be positioned within a precise rotational orientation which may be troublesome, difficult or time consuming.

Therefore, it is apparent that the prior art tool holders for high torque end mill and similar tools present undesirable disadvantages and limitations.

SUMMARY OF THE INVENTION

The present invention is a chuck assembly for a large-diameter end mill or similar tool which overcomes the disadvantages and limitations of the prior art holders for similar tools.

The holder of the present invention is a chuck assembly and collet which includes a tool-securing pin in the collet for engaging one flat on the tool and a screw (preferably a ballclamp screw) having threads coupled to the chuck body, and extending through an aperture in the collet to seat on the other flat on the tool.

It is an object of the present invention to provide a tool holding apparatus for precision machining with standard, commercially-available large-diameter end mill (or similar) tools.

The present invention has, as one feature, a high resistance to axial pullout and improved resistance to rotational forces.

The chuck assembly of the present invention also features a chuck assembly, collet and tool holder which when fully assembled, exhibits characteristics (resistance to cutting forces) as if it were a single solid piece, rather than three separate pieces.

The present invention has the advantage that it uses standard, commercially-available tools, without requiring expensive and time-consuming customizing of the tool shanks.

The assembly of the present invention also has the advantage that tools may be quickly and easily inserted, removed and changed.

A further advantage of the present invention is that the shank of the tool need not be precisely oriented radially with respect to the chuck assembly in order to be properly secured.

The present invention also includes a novel method of making a chuck assembly for receiving and retaining a standard type, (generally available) high-torque end mill tool. The method includes providing the collet with a radial aperture extending therethrough and mounting a screw (preferably a ballclamp screw) to the chuck body, through the collet aperture and engaging the tool.

The foregoing and other objects, features and advantages of the present invention will be apparent to one skilled in the art in view of the following description and claims and the appended drawings.

DETAILED DESCRIPTION OF THE DRAWINGS

Figure 1:
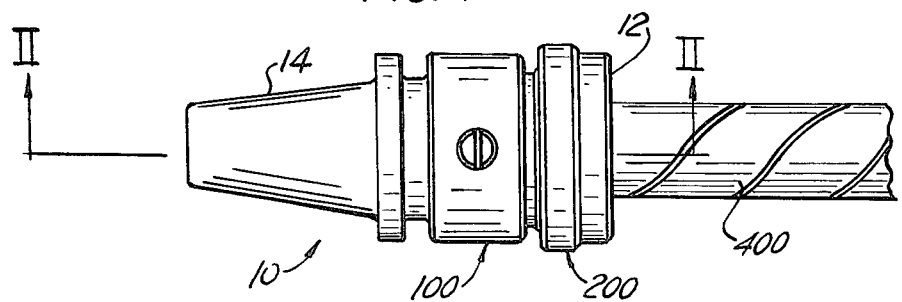
FIG. 1 is a side view of a chuck assembly of the present invention.

FIG. 1 is a cross-sectional view of a chuck assembly 10 of the present invention. The chuck assembly 10 includes a chuck or collet holder 100 and a lock nut 200 and has a cutting tool 400, such as an end mill, extending from a front end 12 of the chuck assembly. A rear end 14 of the chuck assembly is configured and dimensioned to be inserted into a conventional machine tool spindle (not shown) which drives the chuck assembly 10 and tool 400 for machining.

The chuck assembly 10 of the present invention is very similar (with the exception of obvious differences described hereafter), to the chuck assembly described in the Non-Pullout Collet Patent referenced above and incorporated herein by reference. However, the chuck assembly, collet and tool embodied in this invention are generally of a larger diameter and higher strength than those contemplated in the referenced Patent, with significantly greater associated forces and torques.

The external surface of the collet holder 100 differs from the collet holder in the referenced Patent by the provision of a radial aperture 115 in which a screw 150 is mounted. The purpose of the screw 150 will be apparent from the description of FIGS. 2 and 3 which follows.

Figure 2:
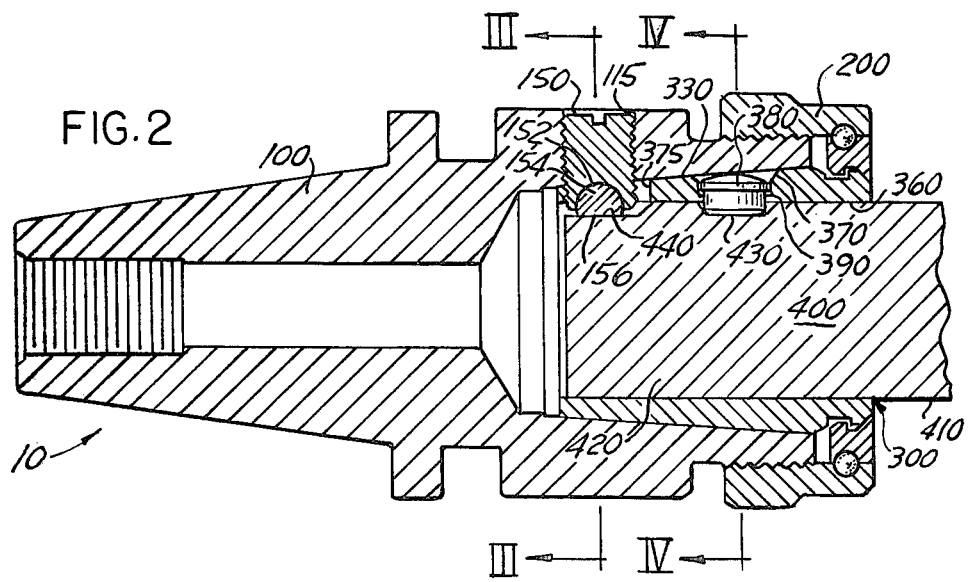
FIG. 2 is an enlarged, cross-sectional view of a portion of the chuck assembly of FIG. 1, taken along the line II—II, looking in the direction of the arrows.

FIG. 2 is an enlarged cross-sectional view of the chuck assembly 10. The chuck assembly 10 includes the chuck body or collet holder 100 and the lock nut 200 described above. A collet 300, shown in this view, includes a locking pin 380 and snap ring 390 mounted in a radial aperture 370, all as described more fully in the referenced Non-Pullout Collet Patent. The collet 300 of the present invention differs from that depicted and described in the Non-Pullout Collet Patent, in that a second radial aperture 375 extends through the collet 300 from its outer surface 330 into its bore 360. The radial aperture extends to the rear end of the collets.

The tool 400 has a forward cutting portion 410 and a rear shank portion 420, which has a first beveled flat portion 430 (as discussed in the Non-Pullout Collet Patent) and an additional flat portion 440. The additional flat portion 440 is common on commercially available larger diameter (⅞ inch and larger) end mill tools.

The screw 150 is a "ball clamp screw" type having a hemispherical recess 152 at its lower end into which a ball 154 is mounted. The ball 154 has a flat surface 156 for engaging the additional flat 440. The ball 154 is free to rotate within the screw recess 152 to accommodate a radial misalignment of the flat 440 by up to approximately 12° with respect to the aperture 115 without making a poor mechanical connection therewith. The screw 150 has external threads which engage complementary threads on the aperture 115. When the screw 150 is tightened to form a good seat of the flat ball surface 156 on the flat 440, the tool 400 is solidly coupled to the collet holder 100 and will not turn with respect to the tool holder without a failure of the ballclamp screw 150.

Figure 3:
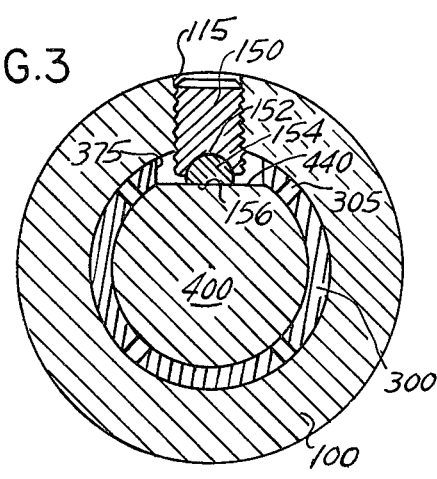
FIG. 3 is a cross-sectional view of the chuck assembly of FIG. 2, taken along the line III—III, looking in the direction of the arrows.

FIG. 3 illustrates a cross-sectional view of the ballclamp screw 150 and its engagement of the rear flat 440 on the tool 400. The screw 150 is screwed down, through the threaded aperture 115 to clamp the flat part 156 of the ball 154 on the flat 440. The ball is free to rotate and does rotate to achieve maximum alignment between the flat surfaces 156, 440 as the rotational forces are applied to the screw 150. The collet 300 and its slots 305 (as described in the referenced Patents) and its rear aperture 375 are shown in this view. The rear aperture 375 in the collet is merely a window, or communicating link, through which the shank of the ballclamp screw 150 passes and the aperture 375 itself has no threads or other involvement with the screw 150.

Figure 4:
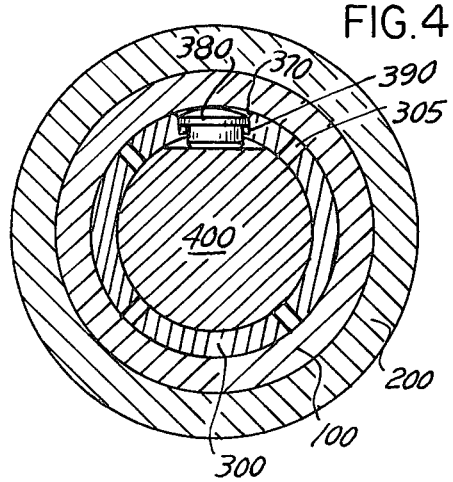
FIG. 4 is a cross-sectional view of the chuck assembly of FIG. 2, taken along the line IV—IV, looking in the direction of the arrows.

FIG. 4 is a cross-sectional view of the apparatus for retaining the tool 400 within the collet 300 against axial pullout. Although there are several acceptable methods of achieving this retention, the preferred method is described in the referenced Non-Pullout Collet Patent. The collet 300 includes a pin 380 movably mounted by a spring member 390 within a radial aperture in the collet 300. The collet includes slots 305 to allow the collet to be resiliently radially compressed in its mounting within the bore of the collet holder 100. The locking nut 200 is also shown in this view. It is considered desirable that the collet 300 be positively coupled to the tool 400 and the tool 400 be positively coupled to the collet holder 100.

The foregoing description of the preferred embodiment is merely exemplary of the present invention. The structure shown may be modified in many ways known to those skilled in the art without departing from the spirit of the present invention. Further, some features of the present invention may be used without the corresponding use of other features. For example, other configurations of screws (i.e., a set screw) might be used to advantage in place of the preferred ballclamp screw described. There are also other non-pullout arrangements for retaining an end mill tool against axial pullout forces. There are also other tools besides end mills which might be used in the chuck assemblies of the present invention. Accordingly, the present description should be considered as illustrative of the present invention only and should not be taken as limiting the scope of the invention which is solely by the following claims.

Having thus described the invention what is claimed is:

1. A chuck assembly for retaining a tool comprising: a chuck body having an outer surface, an internal, rearwardly tapering bore and a radial aperture extending through the body between the outer surface and the bore;

a collet mounted within the tapering bore of the chuck body, said collet including a tool receiving bore and means for locking a tool mounted within the bore against axial pullout therefrom, said collet also including an aperture extending therethrough into the bore and aligned with the radial aperture of the chuck body; and means for securing the chuck body to a tool mounted within the tool receiving bore of the collet, said securing means including a flat surface pivotally coupled to said chuck body, said securing means mounted to said chuck body and extending through the aligned radial apertures in said chuck body and collet.

2. A chuck assembly of the type described in claim 1 wherein said securing means further includes means for aligning the flat surface of the securing means with a complementary surface on the tool.

3. A chuck assembly of the type described in claim 2 wherein the aligning means includes a convex surface mounted within a concave recess in a screw which is tightened to align the surfaces.

4. A chuck assembly for receiving and retaining a conventional tool having two axially spaced flat surfaces on its shank, said assembly comprising:

a collet holder having an outer surface, an internal, rearwardly tapering bore and a first radial aperture extending through the body between the outer surface and the bore;

a collet mounted within the tapering bore of the collet holder, said collet including a tool receiving bore and means for securing the tool within the bore against axial pullout therefrom, said collet also including a second radial aperture extending therethrough into the bore and aligned with the first radial aperture; and means for directly coupling the collet holder to the tool mounted within the tool-receiving bore of the collet, said coupling means mounted to said collet holder and extending through the aligned first and second radial apertures in said collet holder and collet, said coupling means including a flat surface pivotally coupled to the collet holder for engaging one of the flat surfaces on the tool shank.

5. A chuck assembly for retaining a cutting tool comprising:

a chuck body having an outer surface, an internal bore and a radial aperture extending through the body between the outer surface and the internal bore;

a collet mounted within the internal bore of the chuck body and including a tool-receiving bore extending axially through the collet and a transverse bore extending between the outer surface of the collet and the axial collet bore;

means coupled to said collet but not to the chuck body for releasably retaining a tool within said axial collet bore; and a ballclamp screw for securing the chuck body directly to the tool when the tool is mounted within the tool-receiving bore of said collet, said screw including rear portion coupled to the chuck body and passing through the collet and forward flat portion pivotally mounted to engage the tool by conforming to a flat forward tool portion.

6. An assembly for retaining and driving a tool comprising:

a chuck body having an outer surface, an internal bore and a threaded aperture extending through the chuck body between the outer surface and the bore;

a tool holder mounted within the internal bore of the chuck body, said tool holder having a body with a tool receiving bore and first and second apertures extending through the body and into the tool receiving bore, said first aperture adjacent the threaded aperture of the chuck body;

means for securing the tool to the collet, said means including a pin coupled to the collet extending through the second aperture of the collet; and a threaded member mounted within the threaded aperture of said chuck body and extending through the first aperture of the tool holder, said threaded member having a flat terminating portion being pivotally mounted to the threaded member to engage a flat surface on the tool.

* * * * *